United States Patent [19]

Baur et al.

[11] 4,396,756
[45] Aug. 2, 1983

[54] ALDEHYDE CONDENSATE TACKIFIERS FOR RUBBER

[75] Inventors: Richard Baur, Mannheim; Knut Oppenlaender, Ludwigshafen; Gerhard Paulus, Weinheim; Hubertus Queins, Friedelsheim; Hubert Schoeppl, Weinheim, all of Fed. Rep. of Germany

[73] Assignee: BASF Aktiengesellschaft, Fed. Rep. of Germany

[21] Appl. No.: 961,719

[22] Filed: Nov. 17, 1978

Related U.S. Application Data

[62] Division of Ser. No. 848,212, Nov. 3, 1977, abandoned.

[30] Foreign Application Priority Data

Nov. 10, 1976 [DE] Fed. Rep. of Germany ..... 26511728

[51] Int. Cl.³ .................. C08G 14/06; C08L 7/00; C08L 9/00; C08L 61/34

[52] U.S. Cl. .................. 528/162; 528/211; 528/212; 528/269; 525/138; 525/139; 525/141

[58] Field of Search .................. 528/162

[56] References Cited

U.S. PATENT DOCUMENTS 4,020,048 4/1977 Harrop .................. 260/5
4,146,512 3/1979 Weaver et al. .................. 260/3

FOREIGN PATENT DOCUMENTS 131015 1/1949 Australia .................. 260/845

*Primary Examiner*—Wilbert J. Briggs, Sr.
*Attorney, Agent, or Firm*—Keil & Witherspoon

[57] ABSTRACT

Condensation products of aniline, a phenol or alkylated phenol and an aldehyde, especially formaldehyde, may be used as tackifiers and aging retardants for rubber, especially natural rubber.

4 Claims, No Drawings

ALDEHYDE CONDENSATE TACKIFIERS FOR RUBBER

This is a division of application Ser. No. 848,212 filed Nov. 3, 1977 now abandoned.

The present invention relates to aldehyde condensate tackifiers for rubber, a process for their manufacture, and their use.

Non-vulcanized rubber articles, e.g. sheets or strips, require to exhibit contact tackiness when fabricating the finished article. It is only this tackiness which permits shaping before vulcanization. The tackiness should furthermore substantially persist during the storage conventionally encountered under production conditions, until the fabrication is carried out.

The tack is conventionally improved by adding tackifiers to the rubber mixture. Such tackifiers include rosin, coumarone resins, hydrocarbon-based resins and phenol/aldehyde resins. However, the tack thus achievable is inadequate in many cases and, for example, sometimes rapidly decreases if the rubber is stored for several days.

A tackifier for raw rubber, disclosed long ago, is a condensate of acetylene and tert.-butylphenol; its manufacture and properties are described, for example, in German Pat. Nos. 642,886, 645,112, 647,036 and 734,241.

Since the manufacture of the resin is relatively expensive and the effect of the resin on various types of rubber differs greatly, there is, furthermore, a need for new tackifiers which are suitable for the above purpose and in particular improve the tack of natural rubber, or of rubber mixtures containing natural rubber, for which the conventional tackifiers are not fully satisfactory.

We have found a new condensate which is an excellent tackifier for various types of rubber and is, furthermore, obtained from very cheap raw materials.

This tackifier is a condensate of a phenol, aniline and an aldehyde, which contains, per mole of the phenol, from 0.1 to 1.3, preferably from 0.2 to 1, mole of aniline and from 0.5 to 2.5, preferably from 0.8 to 2, moles of the aldehyde, and wherein the molar ratio of the sum of aniline and the phenol to the aldehyde is from 1:0.5 to 1:1.

Suitable phenols are unsubstituted phenol and aliphatically substituted phenols, e.g. cresol, propylphenol, p-tert.-butylphenol, p-isooctylphenol and p-isononylphenol. Bisphenols in which the link consists of an aliphatic hydrocarbon chain, e.g. 2,2-bis-(4-hydroxyphenyl)-propane, may also be used. In general, these phenols are of 6 to 20 carbon atoms.

Isooctylphenol and isononylphenol are preferred. The conventional technical products contain the alkyl substituent predominantly in the p-position.

Examples of suitable aldehydes are those of 1 to 4 carbon atoms, e.g. formaldehyde, acetaldehyde, propionaldehyde and isobutyraldehyde, the condensation products of which are known to be solid.

It is true that aldehydes of more than 4, for example of up to 10, carbon atoms, e.g. 2-ethylhexanal, or aromatic aldehydes, e.g. benzaldehyde, may also be used in a condensation reaction to give very effective products, but the latter are mostly liquid and therefore unfamiliar to a rubber processor. Nevertheless, provided a suitable mixing technique is employed, they are also very useful rubber auxiliaries.

In principle, similar remarks apply to alkylphenols with side chains of more than nine carbon atoms, e.g. decylphenol or dodecylphenol.

(Iso)-octylphenol and -nonylphenol for the purposes of the invention mean products which are obtained, for example, from 2-ethylhexanol or certain propylene oligomers on the one hand and phenol on the other hand, and accordingly are alkylphenols of 8 or 9 carbon atoms in the alkyl substituent, the latter generally being branched. These particular alkylphenols are commercial products. The condensates which may be manufactured therefrom in accordance with the invention, especially the condensates with formaldehyde, appear to be new compounds.

The condensation products according to the invention are manufactured in principle by reacting the raw materials in aqueous, acid or strongly acid solution, but can also be formed under alkaline conditions; the temperature is as a rule maintained at or below the boiling point of the mixture, and the process can in general be carried out at about atmospheric pressure. It is often advantageous to carry out the condensation in the presence of an organic diluent, e.g. a hydrocarbon which forms an azeotrope with water.

Examples of acid condensing agents which may be used are sulfuric acid, sulfonic acids, phosphoric acids and carboxylic acids; the alkaline condensation, which as a rule gives resins with a higher softening point, is frequently carried out under anhydrous conditions, i.e. using paraformaldehyde instead of an aqueous formaldehyde solution, some solid KOH or NaOH, for example, being added to the reaction mixture.

It is known that aldehyde condensates, e.g. condensates of formaldehyde, can be obtained not only with aminoplast precursors (urea and the like) and phenoplast precursors (phenols, naphthols and the like), but also with mixtures of these and with mixtures comprising other condensable compounds. However, such mixtures have, by and large, not attained any particular industrial importance, because the condensation characteristics of aminoplasts and phenoplasts and other compounds (e.g. amines) differ substantially and co-condensates are often only formed under narrowly circumscribed conditions.

Thus, the recent German Laid-Open Application DOS No. 2,217,099 proposes the manufacture of synthetic resins from aniline, phenol and formaldehyde, which are supposedly usable as casting, impregnating, laminating, coating, adhesive and/or surface-finishing resins. Particular emphasis is given to the use of the products as impregnating and casting resins for electrical purposes, whereas their use as rubber auxiliaries is not mentioned. Furthermore, the compounds are intended to be cured, i.e. converted to an insoluble state, during further processing.

By contrast, the condensates obtainable in accordance with the invention, especially those containing aliphatic substituents, are excellent tackifiers and to some extent also act as stabilizers against degradation (aging) by light, air and heat.

The condensates in general have softening points of from room temperature to 160° C. Condensation products which soften at from 80° to 160° C. are particularly suitable for processing by conventional techniques. It is advisable, when processing these condensation products on conventional machines (kneaders or mills) to maintain a temperature near the softening point of the resin, as is conventional practice.

The rubber mixtures may contain from 1 to 20, preferably from 2 to 10, percent, based on the rubber constituent, of the condensation products according to the invention. In addition, the mixtures may contain the conventional rubber additives, for example fillers, e.g. carbon black, silica or talc, mineral oil plasticizers, aging retardants, accelerators, activators, crosslinking agents, flameproofing agents and agents for improving the odor.

Compared to untreated mixtures and to mixtures treated with commercial tackifiers, e.g. coumarone resins, hydrocarbon resins or conventional phenolic resins, an improvement in tack, which is very pronounced in the case of natural rubbers, is observed.

A measure of the tack is obtained by measuring the force required to pull apart 2 strips of the rubber mixture to be tested. The strips are first pressed against one another under a defined pressure. In order that, when testing mixtures with good tack, the specimen shall not itself tear, the strips are laminated to a flexible fabric. The tack is specified in kp and relates to an effective width of the strip of 6 mm. The measuring range extends from 0 to a maximum of 4 kp (Bussemaker and van Beek in Rubber Chemistry and Technology 37, (1964), No. 1: "A new type of tackmeter").

It is also known that rubber changes its properties on storage and during use. The phenomena affecting the usefulness of articles made from rubber are referred to as aging. A number of substances which are added to rubber, or mixtures prepared therefrom, to retard aging have been disclosed. Examples include phenols or nitrogen-containing organic compounds, in particular reaction products of aldehydes with aromatic amines. An aldol-2-naphthylamine resin has also been disclosed as an aging retardant.

It is an advantage if tackifier resins exhibit a pronounced retarding effect on aging in addition to improving the tack.

We have found that the resins according to the invention tested as tackifiers provide good protection against heat aging, far exceeding the protection provided by conventional tackifiers. This effect is an advantage over the conventionally used resins. The retardation of aging is so pronounced that it may at times make sense to add such resins as aging retardants where a tackifying effect is not required at all.

EXAMPLE 1

The aging retardation was tested using a natural rubber mixture of the following composition:

100.0 parts of masticated natural rubber
40.0 parts of carbon black
3.0 parts of naphthenic plasticizer
5.0 parts of zinc oxide
1.5 parts of stearic acid
2.5 parts of sulfur 1.0 part of N-cyclohexyl-2-benzothiazylsulfenamide accelerator. 5 parts of the resin described in Example 3 below were added to this mixture and test specimens produced therefrom were vulcanized for 20 minutes at 143° C. Some of the samples were aged for 48 hours and 100 hours in air at 100° C.

A survey of the results is given below.

|  | Tensile strength kp/cm$^3$ | | | Elongation in % of original length | | |
| --- | --- | --- | --- | --- | --- | --- |
|  |  | 100° C. | 100° C. |  | 100° C. | 100° C. |
| Additive | no aging | 48 h | 100 h | no aging | 48 h | 100 h |
| none | 283 | 96 | 54 | 562 | 270 | 206 |
| 5 parts of resin 3 | 274 | 186 | 144 | 590 | 354 | 282 |

EXAMPLES 2 TO 9

The procedure used in Example 2 is described as being representative of the condensation reactions summarized in Table 1 below.

160 g (1.6 moles) of aqueous 30 percent strength formaldehyde solution are added gradually to a solution of 55.8 g (0.6 mole) of aniline, 288.4 g (1.4 moles) of isooctylphenol and 1.7 g of phosphorous acid in 500 ml of xylene at 80° C. When all has been added, the mixture is stirred for a further hour at the reaction temperature and is then dehydrated azeotropically in the conventional manner, during which dehydration the temperature slowly rises to 150° C. After boiling for a further 3 hours under reflux, the solvent and any residual aniline are distilled off under reduced pressure. A brown resin having a softening point of 30° C. is obtained.

TABLE 1

| Example No. | Phenol | Amine | Aldehyde | Molar ratio | Catalyst | Condensation conditions | | | Softening point |
| --- | --- | --- | --- | --- | --- | --- | --- | --- | --- |
|  |  |  |  |  |  | Solvent | Total time | Temperature |  |
| 1 | i-octylphenol | aniline | formaldehyde | 0.3:1:0.9 | KOH | xylene | 6 hours | 1 hour at 80° C.; dehydrate up to 160° C. | 45° C. |
| 2 | i-octylphenol | aniline | formaldehyde | 0.6:1.4:1.6 | H$_3$PO$_3$ | xylene | 6 hours | 1 hour at 80° C.; dehydrate up to 160° C. | 30° C. |
| 3 | i-octylphenol | aniline | formaldehyde | 1:1:1.6 | KOH | xylene | 6 hours | 1 hour at 80° C.; dehydrate up to 160° C. | 94° C. |
| 4 | bisphenol A | aniline | formaldehyde | 1:1:1.8 | p-TSA | — | 4 hours | 1 hour at 80° C.; dehydrate up to 180° C. | 125° C. |
| 5 | i-nonylphenol | aniline | formaldehyde | 1:1:1.8 | p-TSA | xylene | 6 hours | 1 hour at 80° C.; dehydrate up to 160° C. | 30° C. |
| 6 | phenol | aniline | isobutyraldehyde | 1:1:1.8 | p-TSA | xylene | 6 hours | 1 hour at 80° C.; dehydrate up to 160° C. | 84° C. |
| 7 | t-butylphenol | aniline | isobutyraldehyde | 0.3:0.7:0.8 | p-TSA | xylene | 8 hours | 1 hour at 80° C.; dehydrate up to 160° C. | 50° C. |

TABLE 1-continued

| Example No. | Phenol | Amine | Aldehyde | Molar ratio | Catalyst | Solvent | Condensation conditions Total time | Temperature | Softening point |
|---|---|---|---|---|---|---|---|---|---|
| 8 | t-butylphenol | aniline | formaldehyde | 0.3:0.7:0.8 | oxalic acid | xylene | 6 hours | 1 hour at 80° C.; dehydrate up to 160° C. | 85° C. |
| 9 | phenol | aniline | formaldehyde | 1:1:1.3 | p-TSA | xylene | 6 hours | 1 hour at 80° C.; dehydrate up to 180° C. | 70° C. | p-TSA = para-toluenesulfonic acid

USE EXAMPLES

The resins obtained as described in the above Preparation Examples were tack-tested by mixing, in each case, 5 parts by weight of the resin with 100 parts by weight (based on the rubber component) of one out of three available standard mixtures at 120° C. on a kneading mill and then subjecting the mixture to the test described above; the rubber mixtures (an oil-extended styrene/butadiene rubber, a natural rubber and an ethylene/propylene rubber), for each of which the results are shown in a separate Table, are described below. For comparison, the values (in each case measured at the same time) obtained without an additive, and with the addition of a commercial resin obtained from octylphenol and formaldehyde (AROPHEN 8318® from Ashland) are recorded (in Tables 2, 3 and 4 and the latter resin is referred to an OFH).

The composition of the rubber mixtures is as follows (the designations are those internationally used):

| OESBR | NR | EPDM |
|---|---|---|
| 50 parts of styrene/butadiene rubber | 100 parts of masticated natural rubber | 100 parts of ethylene/propylene rubber |
| 50 parts of oil-extended styrene/butadiene rubber | 50 parts of carbon black | 100 parts of carbon black |
| 50 parts of carbon black | | 50 parts of naphthene-based plasticizer |
| 20 parts of talc | | |
| 10 parts of polybutadiene-based plasticizer | | |

For a proper understanding of the Tables given below it should be pointed out (as is known to those skilled in the art) that only measurements which were obtained under virtually identical conditions (i.e. also at similar times) are being compared. Results relating to identical circumstances (for example, a measurement without an additive, after 3 days' storage) obtained in different series of measurements may differ from one another.

TABLE 2

| | Mixtures based of OESBR | | | | | | |
|---|---|---|---|---|---|---|---|
| | Duration of storage in days | | | | | | |
| | 0 | 1 | 2 | 3 | 4 | 5 | 6 |
| Additive | | | | Tack in kp | | | |
| Resin 1 | 2.5 | 3.0 | | 3.1 | | | 3.8 |
| none | 3.3 | 0.4 | | 0.4 | | | 0.8 |
| OFH | 2.8 | 0.7 | | 0.6 | | | 0.8 |
| Resin 2 | 3.3 | 3.0 | | 3.9 | | | 2.9 |
| none | 3.4 | 1.5 | | 1.4 | | | 1.1 |
| OFH | 2.8 | 1.8 | | 1.0 | | | 1.0 |
| Resin 3 | 2.7 | 3.0 | | 3.9 | | | 3.1 |
| none | 2.9 | 0.6 | | 0.9 | | | 0.6 |
| OFH | 2.8 | 1.8 | | 1.0 | | | 1.0 |
| Resin 7 | 3.7 | | | 3.0 | | | 3.4 |
| none | 3.5 | | | 1.4 | | | 1.1 |
| OFH | 3.0 | | | 1.4 | | | 1.3 |
| Resin 8 | 4.0 | 2.8 | | 3.6 | | | 3.5 |
| none | 3.5 | 1.5 | | 1.4 | | | 1.1 |
| OFH | 2.8 | 1.8 | | 1.6 | | | 1.2 |
| Resin 9 | 3.4 | 2.6 | | 1.9 | | | 1.9 |
| none | 3.2 | 1.0 | | 1.1 | | | 0.8 |
| OFH | 2.8 | 1.8 | | 1.4 | | | 1.0 |

TABLE 3

| | Mixtures based on NR | | | | | | |
|---|---|---|---|---|---|---|---|
| | Duration of storage in days | | | | | | |
| | 0 | 1 | 2 | 3 | 4 | 5 | 6 |
| Additive | | | | Tack in kp | | | |
| Resin 1 | 4.0 | 4.0 | | 4.0 | | | 4.0 |
| none | 4.0 | 0.8 | | 0.6 | | | 0.6 |
| OFH | 4.0 | 1.5 | | 1.3 | | | 1.4 |
| Resin 3 | 4.0 | 4.0 | | 4.0 | 4.0 | | |
| none | 4.0 | 1.1 | | 0.9 | 0.8 | | |
| OFH | 4.0 | 0.9 | | 1.3 | 1.2 | | |
| Resin 4 | 4.0 | | | | | | 4.0 |
| none | 4.0 | | | | | | 0.7 |
| OFH | 4.0 | | | | | | 1.4 |
| Resin 5 | 4.0 | | | | | | 4.0 |
| none | 4.0 | | | | | | 0.7 |
| OFH | 4.0 | | | | | | 1.4 |
| Resin 6 | 4.0 | | | | | | 4.0 |
| none | 4.0 | | | | | | 0.6 |
| OFH | 4.0 | | | | | | 1.4 |
| Resin 7 | 4.0 | 3.9 | | | | | 3.5 |
| none | 4.0 | 0.8 | | | | | 0.5 |
| OFH | 4.0 | 1.4 | | | | | 1.4 |
| Resin 9 | 4.0 | 0.8 | | 0.6 | | | 0.6 |
| none | 4.0 | 1.5 | | 0.7 | | | 0.8 |
| OFH | 4.0 | 4.0 | | 1.0 | | | 1.0 |

TABLE 4

| | Mixtures based on EPDM | | | | | | |
|---|---|---|---|---|---|---|---|
| | Duration of storage in days | | | | | | |
| | 0 | 1 | 2 | 3 | 4 | 5 | 6 |
| Additive | | | | Tack in kp | | | |
| Resin 1 | 2.0 | 2.3 | | 2.4 | | | 2.2 |
| none | 1.2 | 1.0 | | 0.9 | | | 0.6 |
| OFH | 1.3 | 1.4 | | 1.6 | | | 1.4 |
| Resin 3 | 1.6 | 2.8 | | 4.0 | | | 3.6 |
| none | 1.4 | 1.1 | | 1.1 | | | 0.9 |
| OFH | 1.4 | 1.5 | | 1.7 | | | 1.6 |
| Resin 7 | 1.4 | 1.1 | | 1.8 | | | 1.8 |
| none | 1.2 | 0.6 | | 0.4 | | | 0.5 |
| OFH | 1.3 | 1.4 | | 1.6 | | | 1.4 |
| Resin 9 | 1.4 | 1.3 | | 1.5 | | | 1.5 |
| none | 1.2 | 0.6 | | 0.4 | | | 0.5 |
| OFH | 1.3 | 1.4 | | 1.3 | | | 1.4 |

We claim:

1. A condensation product useful as a tackifying agent in rubber compositions, said product being the condensation product of octylphenol or nonylphenol, aniline, and formaldehyde under acid or alkaline conditions and containing per mol of said octyl- or nonylphenol, from 0.2 to 1 mole of aniline and from 0.8 to 2 moles of formaldehyde, the mole ratio of the sum of the moles of aniline and said octyl- or nonylphenol to the moles of formaldehyde being from 1:0.5 to 1:1.

2. A condensation product as claimed in claim 1 wherein said phenol is nonylphenol.

3. A condensation product as claimed in claim 1 wherein said phenol is octylphenol.

4. A condensation product as claimed in claim 1, said product having a softening point in the range of 80° to 160° C.

* * * * *